Figure 1:
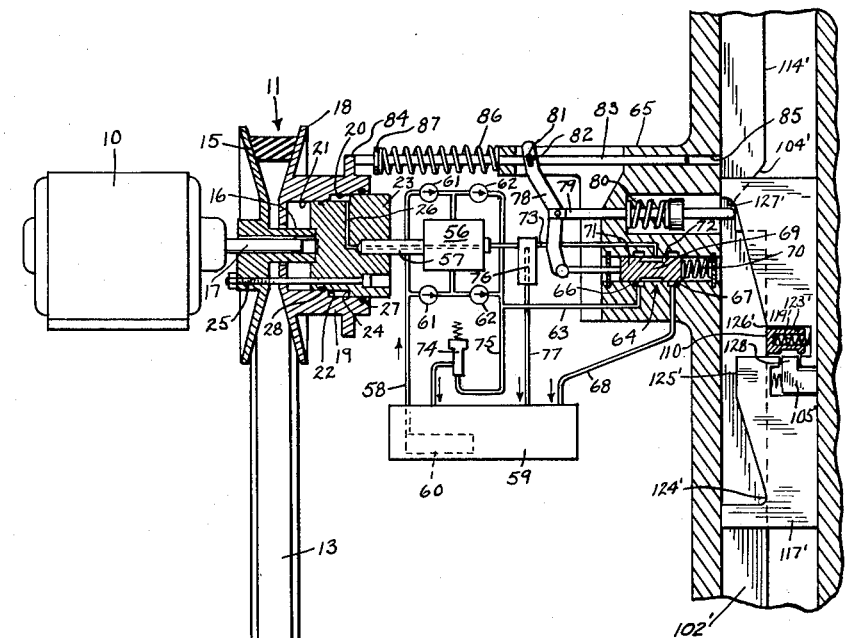
Figure 1:
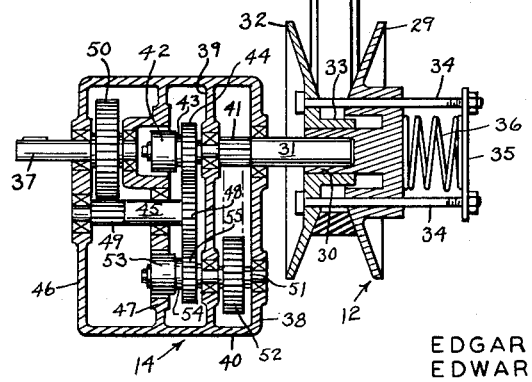

Sept. 1, 1964 W. P. SCHMITTER ETAL 3,146,633
VARIABLE SPEED DRIVE
Filed Jan. 16, 1963 5 Sheets-Sheet 1

INVENTORS
EDGAR S. CHEANEY,
EDWARD J. WELLAUER and
WALTER P. SCHMITTER, DECEASED
BY A. LOUISE SCHMITTER
ROBERT V. ABENDROTH,
CO-EXECUTORS BY *Thomas W. Ehrmann*

ATTORNEY

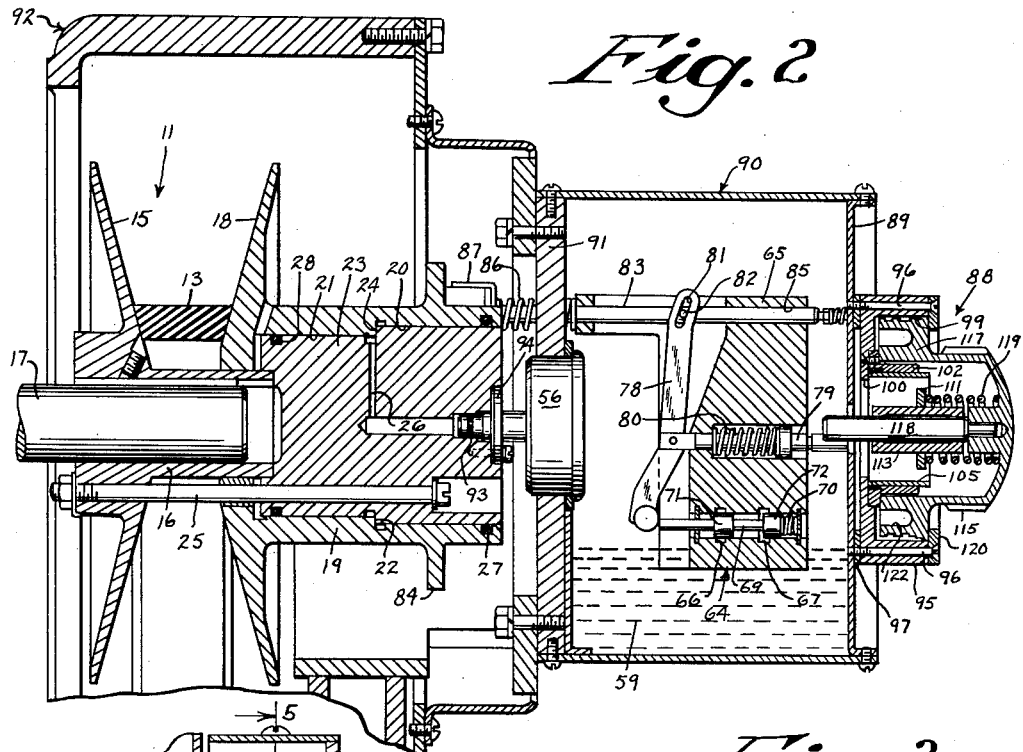
Fig. 2
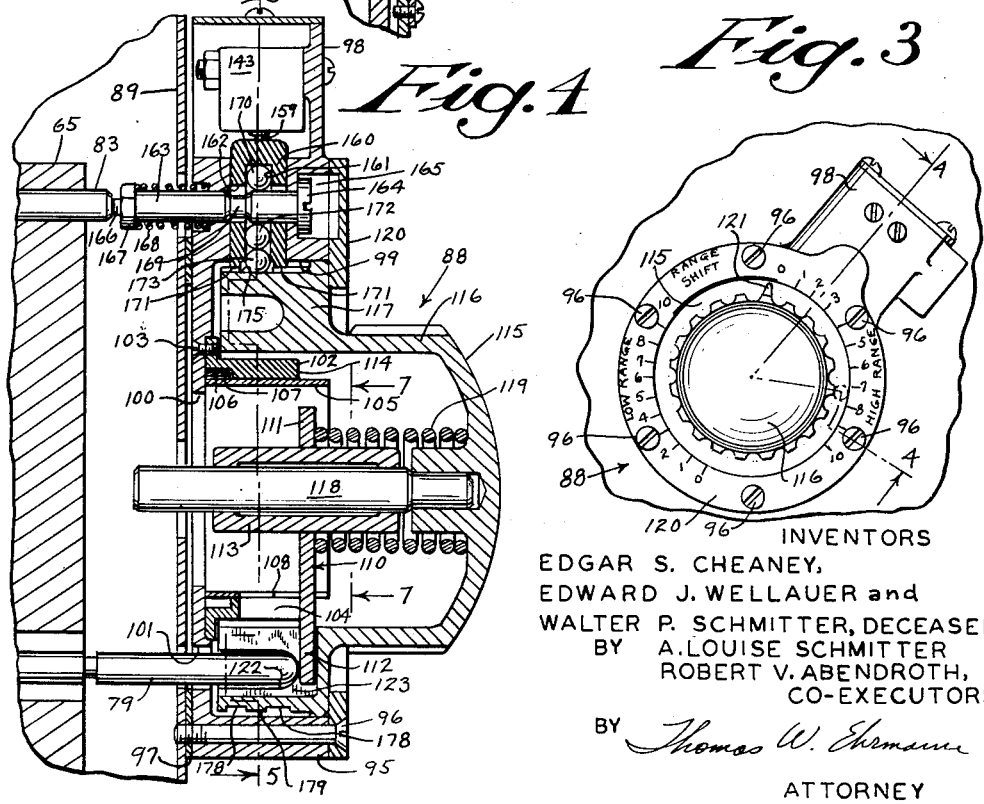
Fig. 4
Fig. 3
INVENTORS
EDGAR S. CHEANEY,
EDWARD J. WELLAUER and
WALTER P. SCHMITTER, DECEASED
BY  A. LOUISE SCHMITTER
ROBERT V. ABENDROTH,
    CO-EXECUTORS
BY *Thomas W. Ehrmann*
ATTORNEY INVENTORS
EDGAR S. CHEANEY,
EDWARD J. WELLAUER and
WALTER P. SCHMITTER, DECEASED
BY A. LOUISE SCHMITTER
ROBERT V. ABENDROTH,
CO-EXECUTORS BY Thomas W. Ehrmann

ATTORNEY

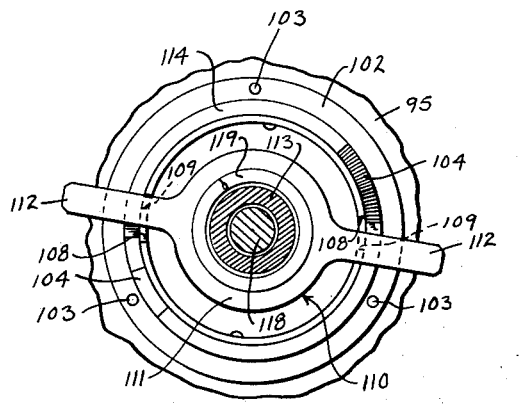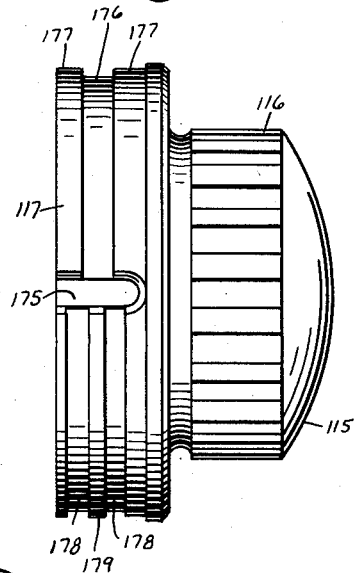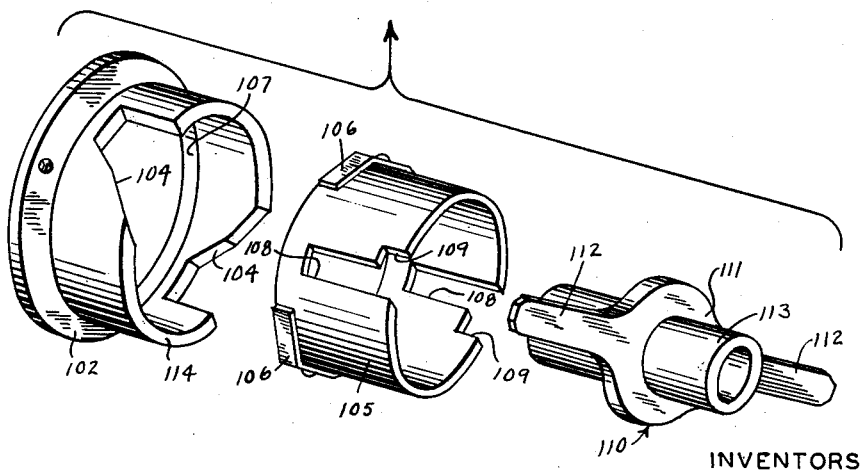

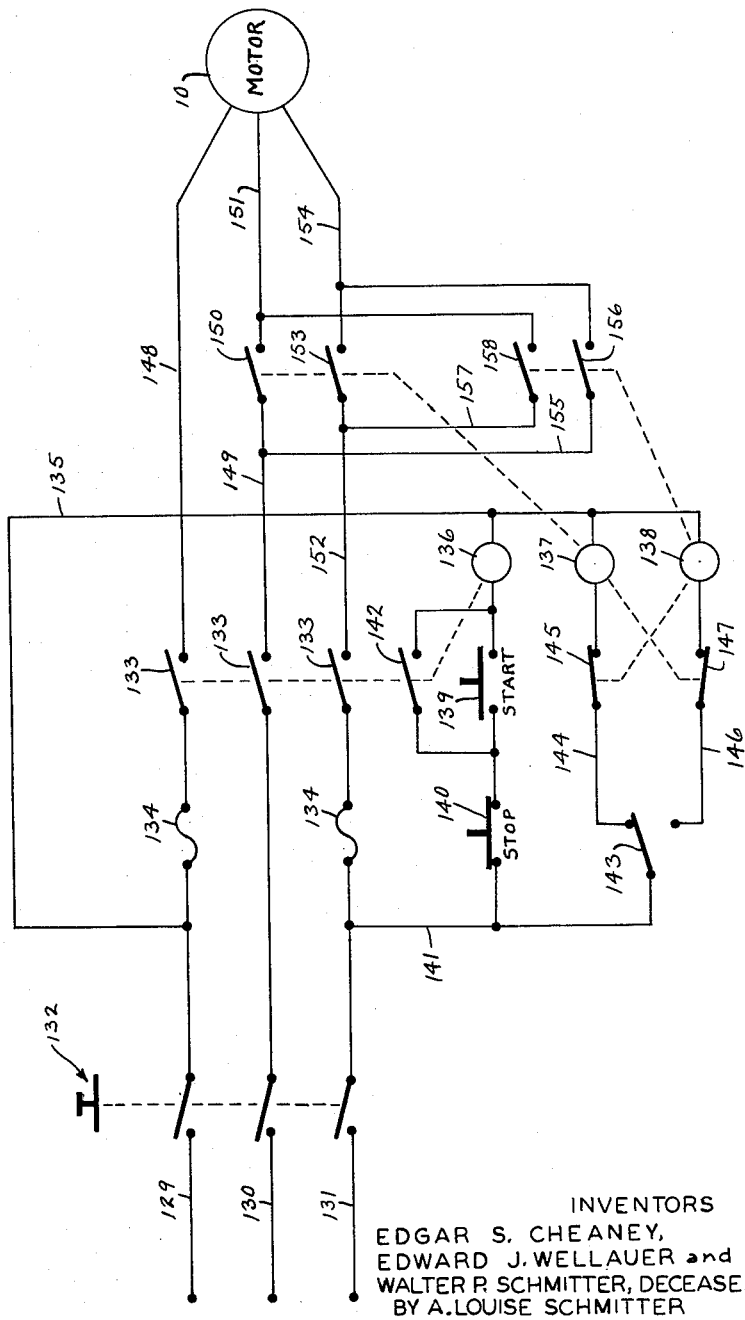

3,146,633
VARIABLE SPEED DRIVE
Walter P. Schmitter, deceased, late of Wauwatosa, Wis., by A. Louise Schmitter, Wauwatosa, and Robert V. Abendroth, Whitefish Bay, Wis., co-executors, Edward J. Wellauer, Wauwatosa, Wis., and Edgar S. Cheaney, Columbus, Ohio, assignors to The Falk Corporation, Milwaukee, Wis., a corporation of Wisconsin
Filed Jan. 16, 1963, Ser. No. 252,281
9 Claims. (Cl. 74—472)

This invention relates to variable speed drives, and particularly to a variable speed drive having selectable high and low speed ranges and means for varying and controlling the speed within each speed range.

Variable speed drives commonly include an adjustable V-belt drive which comprises variable pitch driver and driven pulleys each having a fixed belt engaging flange and a movable belt engaging flange that is axially adjustable relative to the fixed flange to vary the effective pulley diameter. Speed variation is accomplished by varying the effective belt diameter of the driver pulley to effect a corresponding change in the effective diameter of the driven pulley and thereby to change the speed of the driven pulley relative to the speed of the driver pulley. In the V-belt variable speed drives generally, the speed range within which the speed may be varied and controlled is strictly limited by the extent to which the effective belt diameter of the pulleys may be physically varied. However, some applications of variable speed drives may require a drive in which the speed is variable within a much greater range than is obtainable by a common adjustable V-belt drive.

It is a principal object of this invention to provide a variable speed V-belt drive having a wide range within which the speed of the output of the drive may be varied and controlled. This is accomplished in the present invention by providing two speed ranges, a high speed range and a low speed range, together with means for selecting the speed range and means for varying the speed within each range thereby yielding a wider range of control of speed than has been heretofore achieved. For example, if the variable pitch pulleys of the V-belt drive have a ratio of 4 to 1 between their low and high speeds, the inclusion of a pair of speed ranges which have, for example, a ratio of 4 to 1 between the corresponding speed in each range will result in a total speed variation of 16 to 1. The method currently in commercial use to provide anything approaching such a wide range of speed control consists of two variable speed belt drives connected in series. Since the drive of the present invention requires only a single V-belt drive to accomplish the wide range speed control, one of the belt drives is completely eliminated thereby reducing the space occupied by the unit and eliminating considerable expense.

It is, therefore, a further object of this invention to provide a variable speed V-belt drive having selectable high and low speed ranges and means for varying the speed within each range.

It is also an object of this invention to provide such a variable speed drive which may be shifted automatically from one speed range to the other as desired.

It is another object of this invention to provide such a variable speed drive which automatically shifts from a low speed range to a high speed range after the low speed range has been traversed and which automatically shifts back to the low speed range from the high speed range in a speed-decreasing cycle.

It is another object of this invention to provide such a variable speed V-belt drive in which the shift from one speed range to the other occurs at the lowest speed of the driven pulley.

It is another object of this invention to provide a variable speed drive which automatically compensates for changes in the load of the equipment to be driven so that a constant speed is transmitted to the driver equipment regardless of variations in such load.

It is still another object of this invention to provide a variable speed drive including a reversible motor, a two speed motor reducer and a single V-belt drive between the motor and motor reducer together with means for controlling the V-belt drive within the limits of one selectable speed range of the motor reducer, means for automatically reversing the motor at the end of one speed range to select the second speed range of the motor reducer, and means for controlling the V-belt drive throughout the second speed range.

The foregoing and other objects of this invention will appear in the description to follow. In the description, reference is made to the accompanying drawings which form a part hereof and in which there is shown by way of illustration a specific form in which this invention may be practiced. This form will be described in detail to enable those skilled in the art to practice this invention but it is to be understood that other embodiments of the invention may be used and that changes in the embodiment described may be made by those skilled in the art without departing from the true scope of the present invention. Consequently, the following detailed description is not to be taken in a limiting sense and the scope of the present invention is best defined by the appended claims.

Figure 5:
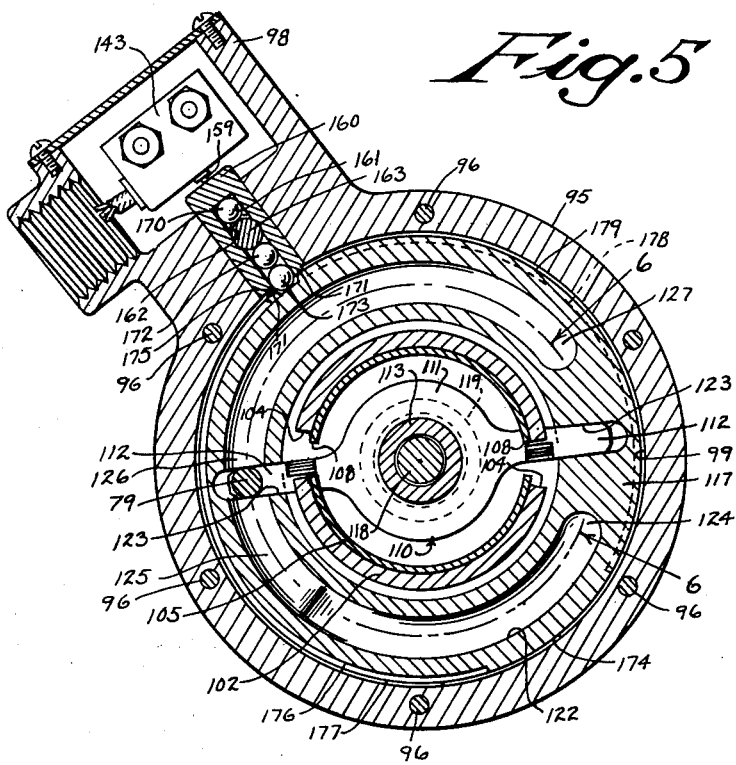
Figure 6:
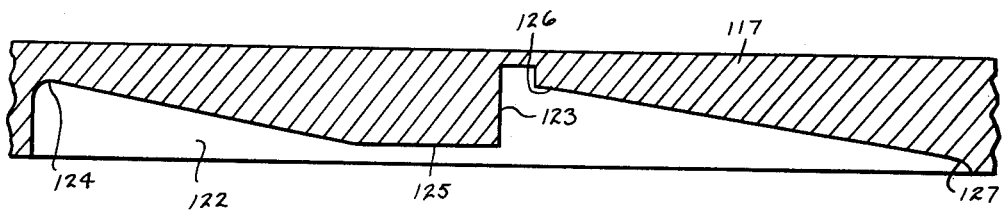

In the drawings:

FIG. 1 is a generally diagrammatic view of a variable speed V-belt drive in accordance with the present invention, FIG. 2 is a view generally in vertical section through a driver pulley of the V-belt drive and control for such driver pulley, FIG. 3 is a view in elevation looking at the front of the control of FIG. 2, FIG. 4 is a view in section taken in the plane represented by the line 4—4 of FIG. 3, FIG. 5 is a view in section taken in the plane represented by the line 5—5 of FIG. 4, FIG. 6 is a diagrammatic view of an arcuate cam surface of the control of FIGS. 3, 4 and 5 developed on a plane, FIG. 7 is a view in section taken in the plane represented by the line 7—7 of FIG. 4, FIG. 8 is a view in elevation of a control knob, FIG. 9 is an exploded view in perspective of cooperating elements, comprising a portion of the control, and FIG. 10 is a diagrammatic view of an electrical control circuit for the motor of the variable speed drive.

Referring to FIG. 1, the variable speed drive of this invention provides for selection and control of a wide range of speed transmitted from a prime mover in the form of a reversible electrical motor 10 to a machine to be driven (not shown). The transmission of power from the motor 10 to the driven machine is accomplished generally, through an adjustable V-belt drive including a driver variable pitch pulley 11 which receives the output of the motor 10 and a driven variable pitch pulley 12 drivingly connected to the driver pulley 11 by a belt 13, and a two speed motor reducer 14 having its input connected to the driven pulley 12 and whose output is adapted for connection with the driven machine.

Specifically, the driver pulley 11 is a hydraulically variable pulley having a stationary flange 15 provided with a central hub portion 16 that is keyed to the drive shaft 17 of the motor 10, and a movable flange 18 which is slidably received about the hub portion 16 of the stationary flange 15 for axial movement to and from the stationary flange 15. The flanges 15 and 18 have inwardly converging interior faces which complement the sloped faces of the V-belt 13. The movable flange 18 has a cylinder portion 19 formed integral therewith and provided with an enlarged outer bore 20 and a coaxial reduced inner bore 21 defining an annular shoulder 22 therebetween (see also FIG. 2). A piston 23 is provided with an enlarged outer portion and a reduced inner portion which are companion to the outer and inner bores 20 and 21, respectively, of the cylinder portion 19 and which define an annular shoulder 24. The piston 23 is disposed within the cylinder portion 19 and bears at its inner end against the hub portion 16 of the stationary flange 15. The piston 23 is held in place against the hub portion 16 by torque rods 25 which extend through the piston 23, the movable flange 18 and the stationary flange 15. The shoulder 22 of the cylinder portion 19 and the shoulder 24 of the piston 23 form the working faces for the application of hydraulic fluid under pressure to move the movable flange 18 relative to the stationary flange 15 to vary the effective diameter of the driver pulley 11. Hydraulic fluid is supplied to the cooperating cylinder and piston through an inlet passage 26 provided in the piston 23. Sealing O-rings 27 and 28 are seated in the cylinder portion 19 and piston 23, respectively, to prevent the loss of hydraulic fluid to the exterior.

The driven pulley 12 is a spring loaded variable pitch pulley having a stationary flange 29 provided with a central hub portion 30 which is bored and keyed to receive an input shaft 31 of the motor reducer 14. A movable flange 32 of the driven pulley 12 has a hub portion 33 which is slidably received about the hub portion 30 of the stationary flange 29 for axial movement to and from the stationary flange 29. Torque rods 34 extend through both flanges 29 and 32 with an abutment plate 35 supported at the ends of the torque rods 34 and forming one bearing surface for a helical compression spring 36 which is biased between the abutment plate 35 and the stationary flange 29. The flanges 29 and 32 of the driven pulley 12 have inwardly converging interior faces which complement the side faces of the V-belt 13.

Generally, the driven pulley 12 both responds to and controls the driver pulley 11. That is, when hydraulic fluid is supplied under pressure to the cooperating cylinder and piston of the driver pulley 11, the movable flange 18 thereof will be forced axially towards the stationary flange 15 thereby increasing the effective diameter of the driver pulley 11 and causing the belt 13 to ride high on the driver pulley 11. The driven pulley 12, although tending to resist changes in belt diameter, will respond to the smaller belt diameter available to it by movement of its movable flange 32 axially away from the stationary flange 29 against the force of the spring 36. At the extreme of this condition, the belt 13 will have the greatest possible diameter about the driver pulley 11 and the smallest possible diameter about the driven pulley 12 with the result that the input shaft 31 of the motor reducer 14 will be supplied with the maximum speed relative to the speed of the motor drive shaft 17. At the other extreme, in which there is little or no hydraulic pressure between the cooperating piston and cylinder of the driver pulley 11, the compression spring 36 of the driven pulley 12 will move the movable flange 32 thereof axially towards the stationary flange 29 thereby increasing the effective diameter of the driven pulley 12 and forcing the movable flange 18 of the driver pulley 11 to move axially away from the stationary flange 15 thereof. Under such circumstances, the input shaft 31 of the motor reducer 14 will be supplied with the slowest possible speed relative to the speed of the motor shaft 17. It will be seen, therefore, that the speed of the input shaft 31 of the motor reducer 14 is controlled by controlling the effective diameter of the driver pulley 11.

The two speed motor reducer 14 has two selectable power trains, one of which accomplishes a double reduction in speed between the input shaft 31 and an output shaft 37 and the other of which accomplishes a triple reduction in speed. The motor reducer 14 is shown diagrammatically only in FIG. 1 since the particular two speed motor reducer which is employed forms no part of the present invention. As shown in the diagrammatic representation of the motor reducer in FIG. 1, the input shaft 31 is journaled in bearings supported by an end wall 38 and an interior partition 39 of a housing 40. The input shaft 31 has an inboard portion provided with a high speed pinion 41 and an outboard portion which extends beyond the partition 39 and supports and forms the inner race for a one way clutch 42. The outer race of the one way clutch 42 is formed with a quill shaft portion 43 concentric with the outboard portion of the input shaft 31, and an intermediate gear 44 is mounted upon the quill shaft portion 43. Another intermediate shaft 45 is journaled in bearings supported by a second end wall 46 and a second partition 47 of the housing 40. Such intermediate shaft 45 has an outboard portion which supports an intermediate gear 48 in meshing engagement with the quill shaft mounted intermediate gear 44 and an inboard portion formed with a low speed pinion 49. The output shaft 37 of the motor reducer 14 is journaled in bearings provided in the end wall 46 and the partition 47 and mounts a low speed gear 50 in meshing engagement with the low speed pinion 49. The input shaft 31, intermediate shaft 45 and the output shaft 37 together with the meshing gearing mounted thereon form one power train of the motor reducer 14 and provide a double reduction in speed. This power train will be operative from one direction of rotation of the input shaft 31 and the intermediate gear 44 on the quill shaft portion 43 will idle when the input shaft 31 is rotated in an opposite direction corresponding to the free running direction of the one way clutch 42.

A further intermediate shaft 51, in parallel spaced relation with the input shaft 31, is journaled in bearings provided in the end wall 38 and the partitions 39. The intermediate shaft 51 mounts an intermediate gear 52 which is in meshing engagement with the high speed pinion 41, and an outboard portion of the intermediate shaft 51 supports and forms the inner race for a second one way clutch 53. The one way clutch 53 has a quill portion 54 formed as a part of its outer race and the quill shaft portion 54 mounts an intermediate gear 55 in meshing engagement with the intermediate gear 48 of the shaft 45. In FIG. 1 the intermediate shaft 51 has been rotated into the plane of the input shaft 31 and intermediate shaft 45 for purposes of illustration only and for this reason the intermediate gear 52 is not shown in actual meshing engagement with the high speed pinion 41. The input shaft 31, intermediate shaft 51, intermediate shaft 45 and the output shaft 37 together with the meshing gearing provided thereon form a second power train through the motor reducer 14 and accomplishes a triple reduction in speed. The one way clutch 53 is suitably arranged upon the intermediate shaft 51 so that it will engage when the input shaft 31 is rotating in the free running direction of the one way clutch 42 and is free running when the input shaft 31 is rotating in the engaging direction of the one way clutch 41.

For purposes of discussion it will be assumed that a counterclockwise rotation of the input shaft 31, as viewed toward the input end of the motor reducer 14, will engage the one way clutch 53 and cause the triple reduction gear train to drive the output shaft 37 in a clockwise direction. Conversely, a clockwise rotation of the input shaft 31 will engage the one way clutch 42 and cause the double reduction gear train to drive the output shaft 37 in a clockwise direction. Thus, when the drive shaft 17 of the reversible motor 10 is rotated in a counterclockwise direction, when viewed toward its output end, the low speed range will be engaged and when the drive shaft 17 is rotated in a clockwise direction the high speed range will be engaged.

The variable speed drive of this invention further includes a hydraulic system for supplying hydraulic fluid to the driver pulley 11, a control for the hydraulic system to thereby control the speed within each speed range, and an electrical control for the selection of the direction of rotation of the reversible motor 10 to select the speed range as desired. The hydraulic system proper includes a two directional fluid pump 56 having a hollow shaft extension 57 mounted in the outer end of the piston 23. The pump 56 draws hydraulic fluid through a pump suction line 58 from a sump 59 and through a suction strainer 60. The hydraulic fluid is drawn through one of a pair of inlet check valves 61 which lead to each side of the pump 56 and are alternately open to the pump depending upon the direction of operation of the pump. Fluid under pressure is supplied from the pump 56 through one of a pair of outlet check valves 62, again depending upon the direction of operation of the pump, to a pump pressure line 63 which leads to a control valve, designated generally by the numeral 64.

The control valve 64 is formed by a bore within a support 65 and includes a first annular relief 66 forming an inlet port for the valve and communicating with the pump pressure line 63. A second annular relief 67 forms a valve return port which communicates with a valve return line 68 that leads back to the sump 59. A plunger 69 is disposed within the bore of the valve 64 and spring biased outwardly by a compression spring 70. The plunger 69 has a pair of axially spaced spools 71 and 72, and a cylinder pressure line 73 communicates with the valve bore between the spools 71 and 72. The cylinder pressure line 73 leads back through the pump 56 and its shaft extension 57 and communicates with the inlet passage 26 formed in the piston 23 of the driver pulley 11.

Generally, when the plunger 69 is moved to the left as viewed in FIG. 1, the spool 71 will open the inlet port 66 while the spool 72 blocks the return port 67 and fluid under pressure from the pump 56 will be supplied to the cooperating cylinder and piston of the driver pulley 11 through the cylinder pressure line 73 and the inlet passage 26 of the piston 23. Increase in hydraulic pressure in the cooperating cylinder and piston will cause the movable flange 18 of the driver pulley 11 to move axially toward the stationary flange 15 thereof, thereby increasing the effective diameter of the driver pulley 11 and increasing the speed of the input shaft 31 of the motor reducer 14 relative to the speed of the motor drive shaft 17. If the plunger 69 is moved to the right as viewed in FIG. 1, the spool 71 will decrease and eventually close the inlet port 66 and the spool 72 will be moved sufficiently to open the return port 67, thereby enabling hydraulic fluid to return to the sump 59 from the cooperating cylinder and piston through the return line 68. The reduction in hydraulic pressure permits the spring loaded driven pulley 12 to expand the flanges 15 and 18 of the driver pulley 11 thereby reducing the relative speed of the input shaft 31 of the motor reducer 14.

The hydraulic system also includes a pressure relief valve 74 which is connected to the pump pressure line 63 through a line 75 and which will open when the pressure in the system exceeds a predetermined level, to permit hydraulic fluid to return to the sump 59. A solenoid controlled valve 76 is placed in the cylinder pressure line 73, and the solenoid controlled valve 76 is open to permit flow through the cylinder line 73 when the electrical system for the motor 10 is energized. When current is shut off to the solenoid controlled valve 76, hydraulic fluid is diverted to the sump 59 through a return line 77.

An extending end of the plunger 69 is engaged by one end of a lever 78 which is pivotally supported intermediate its ends on a follower rod 79 that is slidably received within the support 65 and is spring biased to the right as viewed in FIG. 1 by a compression spring 80. The position of the follower rod 79 is determined by a control for the variable speed drive which will be described hereafter. The reference point for pivotal movement of the lever 78 in response to movement of the follower rod 79 is provided at the upper end of the lever 78 where the lever 78 has an elongated slot 81 which receives a pin 82 extending outwardly of a flange follower bar 83. The flange follower bar 83 bears at one end against an annular extension 84 formed as an integral part of the cylinder portion 19 of the driver pulley 11 and extends through and is slidably supported by support 65 with an opposite end of the flange follower bar 83 being received in an axial bore 85 provided in the support 65. The follower bar 83 is spring biased to the left as viewed in FIG. 1 by a compression spring 86 disposed between the support 65 and a shoulder 87 provided on the bar 83.

Assuming for the moment that the flange follower bar 83 is stationary, it will be seen that as the follower rod 79 moves to the left as viewed in FIG. 1, the end of the lever 78 which contacts the plunger 69 will move to the left thereby permitting the plunger 69 to move outwardly under the force of the spring 70. This will have the effect of increasing the hydraulic fluid pressure supplied to the cooperating cylinder and piston of the driver pulley 11 and thereby increase the speed of the input shaft 31 relative to the motor drive shaft 17. Conversely, movement of the follower rod 79 to the right, as viewed in FIG. 1, will cause the lower end of the lever 78 to force the plunger 69 of the valve 64 inwardly thereby reducing the fluid pressure in the cooperating cylinder and piston of the driver pulley 11 and decreasing the speed of the input shaft 31 of the motor reducer 14.

Once the follower rod 79 has been moved to a given position and retained in such position, an increase in the load of the driven equipment will be reflected through the motor reducer 14 and the driven pulley 12 as an increase in the torque on the belt 13 with the result that the force on the belt 13 will tend to shift the movable flange 18 away from the stationary flange 15 of the driver pulley 11 and would change the speed supplied to the input shaft 31. However, such movement of the movable flange 18 of the driver pulley 11 will cause a similar movement of the flange follower bar 83 to the right, as viewed in FIG. 1. Movement of the flange follower bar 83 will cause the lever 78 to pivot about the follower rod 79 thus permitting the plunger 69 to move outwardly to increase the hydraulic fluid pressure supplied to the cooperating cylinder and piston of the driver pulley 11 and causing the movable flange 18 to return to its proper position. A reduction in the load required by the driven equipment will likewise be compensated for by movement of the flange follower bar 83 to the left, as viewed in FIG. 1, thereby causing a reduction in the pressure of the hydraulic fluid. Therefore, a constant preselected speed will be transmitted to the driven equipment regardless of the load.

The control for the hydraulic system operates upon the follower rod 79 and the electrical control for reversing the motor 10 functions in cooperation with the flange follower bar 83. The control will now be described by reference to FIGS. 2 through 9.

In FIG. 2, a suitable control, designated generally by the numeral 88, is shown mounted upon an end wall 89 of a linkage and valve housing 90 which includes an oppositely disposed support plate 91 that is secured to a supported housing 92. The housing 92 is supported upon a foundation and encloses the drive pulley 11, the driven pulley 12 and the V-belt 13. The details of the V-belt drive housing form no part of the present invention. The valve and linkage housing 90 contains the support 65 discussed above together with the attendant linkage and valve structure previously described. The two directional pump 56 is supported within the support plate 91 with its shaft extension 57 received in an end of the piston 23 and sealed therefrom by an O-ring 93 and a sealing ring 94.

The control 88 is comprised of a control housing 95 which is secured to the end wall 89 by screws 96 that are threadedly received within the end wall 89, and one or more shims 97 are interposed between the base of the housing 95 and the end wall 89. The housing 95 is of generally cylindrical configuration but is provided at one side with an extending portion 98 best seen in FIGS. 3, 4 and 5. The housing 95 has an enlarged outer bore 99 and a reduced inner bore 100 concentric with the outer bore 99 and which together define a base of the housing 95. The base thus defined has an axial opening 101 which is aligned with an opening in the end wall 89 and is adapted to receive the free end of the follower rod 79.

A cam member 102 of generally circular cylindrical configuration is seated upon the base of the housing 95 and secured thereto by screws 103, and, as seen in FIG. 9, the cam member 102 is provided with a pair of similar diametrically opposed cam surfaces 104. A keeper ring 105 is disposed within the cam member 102 and is held axially in place by a pair of spring members 106 that are secured to the exterior of the keeper ring 105 adjacent its base and which ride in a seating bore 107 provided adjacent the base of the cam member 102. The keeper ring 105 is provided on opposite sides with axially directed slots 108 which terminate in notches 109 adjacent the upper periphery of the keeper ring 105. A transfer bar 110 has a central ring-like portion 111 and a pair of arms 112 each of which extends from one side of the central portion 111. A hollow shank 113 extends through the ring-like central portion 111. The transfer beam 110 has its arms 112 disposed in slots 108 of the keeper ring 105 and may generally be described as having its arms 112 bearing against the outer edge 114 of cam member 102, although the arms 112 may be permitted to ride the cam surface 104 of the cam member 102.

A control knob 115 is seated within the outer enlarged bore 99 of the housing 95 and is provided with an extending hand grasping portion 116 and an annular flange portion 117. The knob 115 is generally hollow and a shaft 118 is secured at one end inside the knob 115. The shaft 118 is journaled through the hollow shank 113 of the transfer beam 110, and a helical compression spring 119 is biased between the central ring-like portion 111 of the transfer beam 110 and the underside of the knob 115. The control knob 115 is held in place within the outer bore 99 of the housing 95 against the force of the spring 119 by a ring-like face plate 120 which is attached to the housing 95 by screws 96 which mount the control 88 and which partially overlies the flange 117 of the knob 115. The face plate 120 is provided with a series of indicia as shown in FIG. 3 and an indicator pointer 121 is formed on the knob 115 to cooperate with such indicia.

The flange 117 of the control knob 115 is provided with an annular trough 122. The axially inner surface of the annular trough 122 forms a cam surface upon which the free end of the follower rod 79 rides. The flange 117 is further provided with a pair of diametrically opposed notches 123 which normally receive the arms 112 of the transfer beam 110 and one of the notches 123 is disposed at about the mid-point of the trough 122. The cam surface defined by the trough 122 is shown in FIG. 6 in which the flange 117 has there been developed in a flat plane. Specifically, the cam surface of the trough 122 begins at a high point 124 and slopes generally linearly inwardly to a flat expanse 125 which terminates at one edge of a notch 123. The cam surface again begins at a high point 126 at the opposite edge of the notch 123 and slopes generally linearly inward to a low point 127 which marks the other end of the trough 122.

The operation of the control upon the follower rod 79 may be described by reference to FIG. 1. In FIG. 1, the control is shown schematically and those elements which correspond to elements of the control previously described will be identified by the prime of the reference numeral for such element. Specifically, a flange 117′ is shown guided between parallel supports with the cam surface formed by the trough 122 therein directed towards the free end of the follower rod 79. A transfer beam 110′ is shown received in a notch 123′ of the flange 117′ and is spring biased towards the follower rod 79. A stationary cam member 102′ is shown developed in a flat plane with the cam surface 104′ in its proper relation with the cam surface developed in the flange 117 of the control knob. The keeper ring 105 is stylized by a keeper 105′ which is spring biased towards a right support for frictional engagement therewith and which has a leg 123 adapted to be engaged within a notch in a side of the transfer beam 110′. The flange 117′ is adapted to be moved downwardly, as viewed in FIG. 1, for increase of speed within two speed ranges and is adapted to be moved upwardly as viewed in FIG. 1 for a speed decrease of the input shaft 31 of the motor reducer 14. In FIG. 1 the control is shown in a position in which it has nearly completed a full rotation from low speed in the low range to highest speed in the highest range.

Assume that the flange 117′ is in its uppermost position in which the free end of the follower rod 79 contacts the high point 124′ of the knob cam surface and that the motor drive 17 is rotating in a counterclockwise direction thereby engaging the triple reduction gear train of the motor reducer 14. This condition will yield the lowest speed in the low range. The follower rod 79 will have moved inwardly the greatest distance permitted thereby positioning the plunger 69 of valve 64 to open the return port 67 thereof and there will be little or no pressure in the cooperating cylinder and piston of the driver pulley 11. Thus, the driven pulley 12 will have its greatest possible effective diameter and the output shaft 37 of the motor reducer 14 will be driven at the lowest speed in the low speed range.

To increase the speed of the driven output shaft 37, the knob 115 is rotated clockwise which corresponds with a downward movement of the flange 117′ of FIG. 1. As the flange 117′ is moved downwardly, the follower rod 79 will ride the cam surface formed in the flange 117′ and will therefore be gradually moved inwardly. This will have the effect of pivoting the plunger engaging end of the lever 78 outwardly to open the inlet port 66 of the control valve 64 and to increase the hydraulic pressure in the cooperating cylinder and piston of the driver pulley 11. Such increased pressure will cause the movable flange 18 to shift toward the stationary flange 15 of the driver pulley 11 thereby increasing the relative speed of the input shaft 31 of the motor reducer 14 and increasing the speed of the driven output shaft 37 within the low speed range. Such increase in speed will continue until the free end of the follower rod 79 engages the flat expanse 125′ of the knob cam surface and at this point the follower rod 79 will have moved inwardly its greatest extent permitted and the output shaft 37 of the motor reducer will be driven at the highest speed in the low speed range. The action just described corresponds to a rotation of the control knob 115 through an arc corresponding to the arc between the indicia "0" to "10" of the low range as shown in FIG. 3.

During the above movement of the knob 115 the arms 112 of the transfer beam 110 will ride upon the edge 114 of the cam member 102. This is shown in FIG. 1 as the transfer beam 110′ riding upon the edge 114′ of the stationary cam member 102′. However, after the free end of the follower rod 79 has engaged the flat expanse 125′, further clockwise movement of the control knob 115 would position the transfer beam arms 112 at the cam surface 104 of the cam member 102. The transfer beam 110 is restrained from riding the cam surface 104 by the keeper 105. The frictional engagement of the springs 106 of the keeper ring 105 within the cam member 102 will cause the keeper ring 105 to lag in its rotation within the stationary cam member 102. This will have the effect of causing the arms 112 of the transfer beam 110 to rest in the notches 109 of the keeper ring 105 thereby preventing the transfer beam 110 from moving downwardly in the slot 108 if the direction of rotation is continued. This lagging action of the keeper ring 105 is simulated in FIG. 1. That is, as the flange 117' is moved downwardly, the keeper 105' will frictionally engage the right support and will lag in its movements relative to the movement of the flange 117' whereby the leg 128 of the keeper 105' will engage the notch in the side of the transfer beam 110' thereby holding the transfer beam 110' in its relative position so long as a downward movement of the flange 117' is continued.

Assuming that the flange 117' is moved further downwardly, as viewed in FIG. 1, the follower rod 79 will continue to ride upon the flat expanse 125' of the knob cam surface until it reaches the edge of the notch 123' whereupon it will, under the action of its spring 80 be moved outwardly to engage the transfer beam 110' which acts as an extension of the knob cam surface. At the same time, a control which will be described hereafter causes the motor 10 to reverse its direction thereby selecting the two speed reduction, or higher speed, gear train in the motor reducer 14. With the follower rod 79 engaging the transfer beam 110', the cooperating cylinder and piston of the driver pulley 11 is again subjected to little or no hydraulic pressure and the input shaft 31 of the motor reducer 14 will be driven at the slowest speed relative to the motor drive shaft 17 thereby driving the output shaft 37 at the lowest speed in the high range. To increase the speed of the output shaft 37 within the high speed range, the control knob is rotated further in a clockwise rotation which corresponds to a further downward movement of the flange 117'. Further downward movement of the flange 117' will cause the follower rod 79 to be moved inwardly as it follows the cam surface thereby constantly increasing the hydraulic pressure in the driver pulley 11 and increasing the speed of the input shaft 31 relative to the speed of the motor 10. Such increase in speed will continue until the follower rod 79 engages the low point 127' of the knob cam surface at which time the valve 64 will permit the greatest hydraulic pressure to be fed to the cooperating cylinder and piston of the driver pulley 11. When the follower rod 79 has reached the low point 127' of the knob cam surface, it corresponds with a rotation of the knob 115 to the point "10" in the high speed range (see FIG. 3).

Assume now that it is desired to decrease the speed of the output shaft 37 of the motor reducer 14. This is accomplished by rotating the knob 115 counterclockwise from the point "10" in the high speed range. This will correspond with an upward movement of the flange 117' from its position in FIG. 1. As the flange 117' is moved upwardly, the spring biased follower rod 79 will follow an increasing path along the knob cam surface thereby resulting in a corresponding movement of the plunger 69 of the valve 64 inwardly to decrease the hydraulic pressure in the cooperating cylinder and piston of the driver pulley 11. Thus, the speed of the input shaft 31 of the motor reducer 14 is decreased and the speed of the output shaft 37 is decreased within the high speed range.

When the follower rod 79 engages the edge 126' of the slot 123' the input shaft 31 will be subjected to the slowest speed relative to the motor drive shaft 17 and a further movement of the flange 117' upwardly will cause the follower rod 79 to engage the transfer beam 110'. Furthermore, the transfer beam 110' will have been positioned opposite the cam surface 104' of the cam member 102'. When the flange 117' is moved upwardly the keeper 105', which is in friction engagement with the right support, will again lag in its movement but under such circumstances the lag will disengage the leg 128 from the notch of the transfer beam 110'. Therefore, the transfer beam 110' is not restrained by the keeper 105', and the transfer beam 110' will move into the cam surface 104' of the cam member 102' thereby moving the follower rod 79 inwardly to return to the highest speed for the input shaft 31 of the motor reducer 14. Again, at this point electrical control means reverse the direction of rotation of the motor 10 to select the triple reduction, or low speed, gear train through the motor reducer 14.

The action just described may be related to the actual control. That is, a counterclockwise rotation of the knob 115 will initially cause the arms 112 of the transfer beam 110 to ride upon the edge 114 of the cam member 102. The keeper ring 105 will lag in this movement by the frictional engagement of the spring 106 with the cam member 102 thereby causing the arms 112 with the transfer beam 110 to move out of the notches 109 in the keeper ring 105 and against the straight edge of the notch 108 in the keeper ring 105. Then, when the knob 115 has been rotated a sufficient amount to align the notch 109 and keeper ring 105 with the sheer drop in the cam surface 104 of the cam member 102, the spring 119 will cause the transfer beam 110 to be moved downwardly into the cam member 102 with the arms 112 moving the follower rod 79 inwardly.

Referring again to FIG. 1, the transfer beam 110' positions the follower rod 79 at the level of the flat expanse 125' so that a further upward movement of the flange 117' will engage the flat expanse 125' of the knob cam surface with the follower rod 79. This position corresponds to the highest speed in the low speed range. Further upward movement of the flange 117' will cause a decrease in speed within the low speed range and when the free end of the follower rod 79 engages the high point 124' of the knob surface the variable speed drive will produce the lowest output speed in the low range. The transfer beam 110 moves out of its bottoming in the cam member 102 by riding up the sloping portion of the cam surface 104 until it returns to riding upon the edge 114 of the cam member 102.

For any particular setting of the control knob 115, should the load of the driven equipment increase or decrease and result in a change of speed of the output shaft 37 of the motor reducer 14 the flange follower bar 83 acting upon the valve 64 through the lever 78 will correct the speed, as previously described, by causing a change in the effective diameter of the driver pulley 11.

Referring to FIG. 10, the motor 10 is preferably an A.C. induction motor which is energized from a three phase A.C. source through power lines 129, 130 and 131. The power line connections to the motor 10 are all interrupted by a disconnect switch 132. The power lines 129, 130 and 131 each connect to one side of normally open relay switches 133, and fuses 134 are placed in the power lines 129 and 131. A conductor 135 leads from the power line 129 to one side of a plurality of relays 136, 137 and 138. The second side of the first relay 136 is connected through push button start and stop switches 139 and 140, respectively, to a conductor 141 that is connected to the power line 131. A fourth normally open relay switch 142 controlled by the first relay 136 is connected across the push button start switch 139. The conductor 141 also connects to the arm of a two position directional control switch 143 which is normally spring biased to close with and connect a conductor 144 leading to the second side of the second relay 137 through a normally closed relay switch 145 of the third relay 138. The alternate position of the directional control switch 143 connects the power line 131 through the conductor 141 to a conductor 146 that is connected to the second side of the third relay 138 through a normally closed relay switch 147 of the second relay 137.

A conductor 148 connects from the second side of the normally open relay switch 133 in the power line 129 to the motor 10. A conductor 149 leads from the other side of the relay switch 133 in the power line 130 to a normally open relay switch 150 of the second relay 137 which closes with a conductor 151 which connects with the motor 10. A conductor 152 connects the other side of the relay switch 133 in the power line 131 of a normally open relay switch 153 of the second relay 137. The relay switch 153 closes with a conductor 154 connected to the motor 10. A conductor 155 is connected across the conductors 149 and 154 and is interrupted by normally open relay switch 156 of the third relay 138, and a conductor 157 is connected across the conductors 152 and 151 and is interrupted by a normally open relay switch 158 also of the third relay 138.

From the foregoing it will be appreciated that with the disconnect switch 132 closed, closing of the push button start switch 139 will energize the first relay 136 thereby closing the relay switches 133, and further closing the relay switch 142 to hold the first relay 136 energized after the release of the push button start switch 139. With the directional control switch 143 in the normal spring biased position, the second relay 137 is also energized through the normally closed relay switch 145 of the third relay 138 thereby opening the relay switch 147 of the second relay 137 to prevent the accidental simultaneous energization of the third relay 138. Energization of the second relay 137 will also close the normally open relay switches 150 and 153 thereby completing the connections of all of the power lines 129, 130 and 131 to the motor 10.

When the directional control switch 143 is moved to its second position, the second relay 137 will be deenergized thereby permitting the relay switch 147 to return to its normally closed position and the third relay 138 will then be energized again with the result of opening the relay switch 145 to prevent simultaneous energization of the second relay 137. Energization of the third relay 138 closes the normally open relay switches 158 and 156 thereby reversing the connections of the power lines 130 and 131 to the motor 10 with the result that the motor 10 will operate in a reverse direction.

Referring to FIGS. 4 and 5, the directional control switch 143 is mounted within a cavity in the extending portion 98 of the control housing 95. A spring loaded actuator button 159 of the switch 43 is adapted to be engaged by one end of a cage member 160 having a central axial bore 161 and a transverse radially elongated bore 162. The cage member 160 is slidably received within a radial bore through the housing 95, and a plunger 163 is slidably received in an axial bore in the housing 95 and extends through the transverse opening 162 in the cage member 160. The plunger 163 has a head 164 at one end which is received within a cavity 165 formed by the housing 95 and the face plate 129. A set screw 166 is threadedly received within the other end of the plunger 163 and a nut 167 is threaded on the set screw 166. A helical compression spring 168 is biased between the nut 167 and the housing 95 to urge the plunger to the left, as viewed in FIG. 4. The plunger 163 also includes an annular detent 169 intermediate its ends. A steel ball 170 is disposed within the axial bore 161 of the cage 160 between the bottom of such axial bore and the plunger 163. The radially inner end of the cage 160 terminates in a pair of spaced legs 171 which ride on the outer periphery of the flange 117 of the control knob 115. A pair of balls 172 and 173 are disposed within the axial bore 161 of the cage 160 between the plunger 163 and the outer circumference of the flange 117 of the control knob 115.

The cage 160 actuates the switch 143 to change the direction of rotation of the reversible motor 10. This reversal is programmed by the provision of switch actuating surfaces on the outer circumference of the flange 117 of the control knob 115. As shown in FIGS. 4, 5 and 8, the outer circumference of the flange 117 is formed with an uninterrupted surface portion 174 and a diametrically opposed flat portion 175 of reduced radius. The outer circumference between the uninterrupted surface 173 and the flat portion 174 is formed with an annular recess 176 which is adapted to receive the ball 173 with the legs 171 of the cage member 160 riding upon the raised races 177 on either side of the recess 176. The generally opposite half of the outer circumference of the flange 117 is provided with a pair of recesses 178 adapted to accommodate the legs 171 of the cage member 160 and the ball 173 rides upon a raised race 179 between the recesses 178. As shown in FIG. 5, the flat portion 175 on the outer circumference of the flange 117 is adapted to be aligned with the ball 173 when the follower rod 79 is positioned axially in the notch 123 which interrupts the cam surface of the knob 115.

In operation, as the control knob 115 is rotated clockwise from "0" to "10" in the low speed range to increase the speed in such range, the ball 173 will ride in the annular recess 176 and the legs 171 of the cage member 160 will ride on the raised races 177 thereby causing the cage member 160 to ride upwardly against the button actuator 159 of the directional control switch 143. Through the full extent of the rotation of the control 115 from the engagement of the follower rod 79 with the high point 124 to the end of the flat expanse 125 of the knob cam surface, the switch 143 will be closed to its alternate position to energize the third relay 138 and thereby to have the motor 10 drive its output shaft 17 in a counterclockwise direction and engage the triple reduction, or low speed, gear train of the motor reducer 14. When the control knob 115 is rotated further to have the follower rod 79 in the notch 123 and in contact with an arm 112 of the transfer beam 110, the flat portion 175 of the circumference of the knob 115 will be positioned under the legs 171 of the cage member 160. The cage member 160 is initially retained in closing engagement with the switch actuator button 159 by the ball 170 which supports the cage member 160 on the plunger 163. However, since the follower rod 79 is now positioned to cause the speed of the input shaft 31 to be reduced from the highest speed to the lowest speed, the flanges of the driver pulley 11 will axially expand and cause the free end of the flange follower bar 83 to engage the projecting end of the plunger 163. When the driver pulley 11 has been expanded to yield its smallest effective diameter, the flange follower bar 83 will have moved the plunger 163 inwardly a sufficient distance for the annular detent 169 to be engaged by the balls 170 and 172. The ball 170 drops into the detent 169 and permits the cage member 160 to rest on the flat portion 175 of the control knob 115 and allows the switch 143 to return to its normal position thereby reversing the motor 10 and shifting the drive to the high speed range. In FIGS. 3, 4, 5 and 7, the control is shown as it would momentarily appear after the follower rod 79 has been positioned in the notch 123 against an arm 112 of the transfer beam 110 but before the driver pulley 11 has fully expanded to reduce the speed of the input shaft 31 to its lowest level. Thus, in FIGS. 3, 4, 5 and 7 the follower bar 83 has not moved the plunger 163 inwardly to align the detent 169 with the balls 170 and 172.

Further movement of the control knob 115 to increase the speed within the high speed range will cause the ball 173 to rise upon the raised race 179 thereby causing the ball 172 to engage the detent 169 to prevent the plunger 163 from moving outwardly after the flange follower bar 83 has retracted when the speed is increased. Furthermore, the legs 171 of the cage member 160 will ride in the recesses 178 to permit the switch 143 to remain in its normal position.

When the knob 115 is rotated counterclockwise from a high speed in the high speed range, the innermost ball 173 will again encounter the flat portion 175 at the lowest speed in the high speed range and the ball 173 will release the plunger 163 and thereby cause the cage member 169 to move close with the actuator button 159 and move the switch 143 to reverse the motor 10. Therefore, it will be seen that reversal of the motor 10 and consequently a shift from one speed range to the other can be accomplished only at the lowest speed for the input shaft 31 of the motor reducer 14.

When the energizing circuit for the motor 10 is opened, the solenoid controlled valve 76 is also deenergized so that hydraulic fluid will drain to the sump 59 and the driver pulley 11 is permitted to expand. Therefore, when the variable speed drive is again placed in operation by closing the circuit to the motor 10, the drive will be required to start from the lowest speed for the input shaft 31.

While the variable speed drive has been described as including a spring loaded variable pitch driven pulley 12, a variable pitch hydraulic driven pulley may also be employed to respond to changes in the diameter of the driver pulley 11.

It will be seen from the foregoing description that the variable speed drive of this invention provides for the transmission of power to a driven apparatus through a wire range of speed. The speed may be varied as desired, and the shift from one speed range to the other is accomplished automatically and always at the lowest speed for the driven pulley. Furthermore, the hydraulic system together with the linkage including the flange follower bar 83, the lever 78, and the follower rod 79 comprise a position sensitive servomechanism control that will function to produce the proper effective belt diameter of the driver pulley for a desired speed and will maintain a constant selected speed regardless of a changing demand for the hydraulic fluid pressure due to changes in the torque load on the V-belt.

The invention claimed is:

1. In a variable speed drive, the combination comprising: a reversible electric motor having a drive shaft; two speed motor reduction means having an input shaft and an output shaft interconnected by a pair of power trains that are alternately selectable by selection of the direction of rotation of said input shaft, one of said power trains being adapted to accomplish a greater reduction in speed of the output shaft relative to the input shaft than the other power train to provide selectable low and high speed ranges; a V-belt drive drivingly connecting the motor drive shaft and the input shaft on said motor reduction means and comprising driver and driven variable diameter pulleys each having a pair of belt engaging flanges, one of said pulleys being mounted on said motor drive shaft and the other of said pulleys being mounted on said input shaft, and a V-belt drivingly engaged about said pulleys, said driven pulley being adjustable relative to said driver pulley to accommodate changes in the effective belt diameter of the driver pulley; actuator means for said driver pulley adapted to vary the effective belt diameter of said driver pulley to thereby vary the speed of said input shaft relative to said motor drive shaft; means for selectively reversing the direction of rotation of said motor and thereby the direction of rotation of the input shaft of said motor reduction means to alternately select the low and high speed ranges; and control means for said actuator means to control the effective belt diameter of said driver pulley to thereby control the speed of the output shaft of said motor reduction means relative to the speed of said motor drive shaft within each speed range.

2. In a variable speed drive, the combination comprising: a reversible electric motor having a drive shaft; a two speed motor reducer having an input shaft and an output shaft interconnected by reduction gearing comprising two power trains that are alternately selectable by selecting the direction of rotation of said input shaft, one of said power trains adapted to accomplish a greater reduction in speed of the output shaft relative to the input shaft than the other of said power trains to provide selectable low and high speed ranges; a V-belt drive connecting the motor drive shaft and the input shaft of said motor reducer, said V-belt drive comprising a driver variable diameter pulley having an axially stationary belt engaging flange secured to the motor drive shaft for rotation therewith and a second belt engaging flange that is axially movable relative to such stationary flange to vary the effective belt diameter of the driver pulley, said driver pulley including a cooperating cylinder and piston each mounted in association with one of said flanges, a driven variable diameter pulley having an axially stationary belt engaging flange secured to the input shaft of said motor reducer and a second belt engaging flange that is movable relative to such stationary flange to vary the effective belt diameter of the driven pulley, and a V-belt drivingly engaged about said pulleys, said driven pulley being adjustable relative to said driver pulley inversely of changes in the effective belt diameter of the driver pulley to thereby vary the speed of said input shaft relative to said motor drive shaft; hydraulic system means for supplying hydraulic fluid under pressure to the cooperating cylinder and piston of said driver pulley; means for selectively reversing the direction of rotation of said motor and thereby the direction of rotation of the input shaft of said motor reducer to alternately select the low and high speed ranges; control means operable upon said hydraulic system means to vary the hydraulic pressure in said cooperating cylinder and piston of the driver pulley and thereby to control the speed of the output shaft of said motor reducer relative to the speed of said motor drive shaft within each speed range; and means responsive to the position of the movable flange of said driver pulley, said last named means being operable upon said control means to adjust the same whenever the movable flange of said driver pulley is moved because of changes in the load on the output shaft of said motor reducer, whereby a given speed for said output shaft is maintained regardless of variations in said load.

3. In a variable speed drive, the combination comprising: a reversible electric motor having a drive shaft; a two speed motor reducer having an input shaft and an output shaft interconnected by reduction gearing comprising two power trains that are alternately selectably engageable to drive said output shaft by selection of the direction of rotation of said input shaft, one of said power trains providing a greater reduction in speed of the output shaft relative to the input shaft than the other of said power trains to provide low and high speed ranges; a V-belt drive connecting the motor drive shaft and the input shaft of said motor reducer, said V-belt drive comprising a driver variable diameter pulley having a pair of belt engaging flanges, one of such flanges being secured to the motor drive shaft for rotation therewith and the other of such flanges being movable relative to the first flange to vary the effective belt diameter of the driver pulley, said driver pulley including a cooperating cylinder and piston each mounted in association with one of said flanges, a driven variable diameter pulley having a pair of belt engaging flanges, one of such flanges being secured to the input shaft of said motor reducer and the other of such flanges being movable relative to the first flange of said driven pulley, and a V-belt drivingly engaged about said pulleys, said driven pulley including means for moving the movable flange thereof to adjust the effective belt diameter of said driven pulley inversely of a change in the effective belt diameter of the driver pulley; hydraulic system means for supplying hydraulic fluid under pressure to the cooperating cylinder and piston of said driver pulley; a reversing motor control circuit for said motor; and unitary control means for said hydraulic system means and for said motor control circuit and adapted to vary the hydraulic pressure in said cooperating cylinder and piston to control the speed of said input shaft relative to said motor drive shaft and adapted to selectively reverse the direction of rotation of said motor and thereby to select the low and high speed ranges.

4. In a variable speed drive, the combination comprising: a reversible electric motor having a drive shaft; a two speed motor reducer having an output shaft adapted for connection to the machine to be driven and an input shaft, said input and output shafts being interconnected by reduction gearing comprising two power trains that are alternately selectably engageable to drive said output shaft by selection of the direction of rotation of said input shaft, one of said power trains providing a greater reduction in speed of the output shaft relative to the input shaft than the other of said power trains to provide selectable low and high speed ranges; a V-belt drive connecting the motor drive shaft and the input shaft of said motor reducer, said V-belt drive comprising a driver variable diameter pulley having a pair of belt engaging flanges, one of such flanges being secured to the motor drive shaft for rotation therewith and the other of such flanges being movable relative to the first flange to vary the effective belt diameter of the driver pulley, said driver pulley including a cooperating hydraulic cylinder and piston each mounted in association with one of said flanges and adapted to move the movable flange toward the first flange under increasing hydraulic fluid pressure, a driven variable diameter pulley having a pair of belt engaging flanges, one of such flanges being secured to the input shaft of said motor reducer and the other of such flanges being movable relative to the first flange of said driven pulley, and a V-belt drivingly engaged about said pulleys, said driven pulley including means for moving the movable flange thereof to adjust the effective belt diameter of said driven pulley inversely of a change in the effective belt diameter of the driver pulley; hydraulic system means for supplying hydraulic fluid under pressure to the cooperating cylinder and piston of said driver pulley; a reversing motor control circuit for said motor; and unitary control means for said hydraulic system means and for said motor control circuit, said control means being adapted to vary the hydraulic pressure in said cooperating cylinder and piston to vary the speed of the output shaft of said motor reducer between low and high speeds within each speed range and adapted to automatically selectively reverse the direction of rotation of said motor after the low speed range has been traversed in a speed increasing cycle and after the high speed range has been traversed in a speed decreasing cycle.

5. A variable speed drive in accordance with claim 4 including means responsive to the position of the movable flange of said driver pulley to prevent the reversal of said motor until such movable flange is in the position relative to the first flange that will produce the lowest speed of the input shaft of said motor reducer relative to the speed of said motor drive shaft.

6. In a variable speed drive, the combination comprising: a reversible electric motor having a drive shaft; two speed motor reduction means having an input shaft and an output shaft interconnected by a pair of power trains that are alternately selectable by selection of the direction of rotation of said input shaft, one of said power trains providing a greater reduction in speed of the output shaft relative to the input shaft than the other power train to provide selectable low and high speed ranges; a V-belt drive drivingly connecting the motor drive shaft and the input shaft of said motor reduction means and comprising a driver variable diameter pulley having an axially stationary belt engaging flange secured to said motor drive shaft for rotation therewith and a second belt engaging flange that is axially movable relative to such stationary flange to vary the effective belt diameter of the driver pulley, said driver pulley including a cooperating cylinder and piston each mounted in association with one of said flanges and adapted to move the movable flange toward the stationary flange under increasing hydraulic fluid pressure, a driven variable diameter pulley having an axially stationary belt engaging flange secured to the input shaft of said motor reducer means and a second belt engaging flange that is axially movable relative to and spring biased towards such stationary flange, and a V-belt drivingly engaged about said pulleys; a pump for supplying hydraulic fluid under pressure from a source to the cylinder and piston of said driver pulley; adjustable valve means in the connection of said pump to said cylinder and piston and adapted to control the hydraulic pressure in said cylinder and piston; a reversing motor control circuit for said motor; and unitary control means operable upon said valve means and said motor control circuit, said control means adapted to adjust said valve means to vary the hydraulic pressure in said cylinder and piston to control the speed of the input shaft of said motor reducer and adapted to automatically selectively reverse the direction of rotation of said motor after one of said speed ranges has been traversed in one direction and after the other of said speed ranges has been traversed in an opposite direction.

7. A variable speed drive in accordance with claim 6 including solenoid valve means in the connection between said pump and said cylinder and piston, said solenoid valve means being responsive to said motor control circuit and being adapted to be opened when said motor is deenergized to have hydraulic fluid return to the source, whereby said input shaft will be initially driven at the lowest speed upon energization of said motor.

8. In a variable speed V-belt drive for the transmission of power between the drive shaft of a prime mover and the input shaft of an apparatus to be driven, the combination comprising: driver and driven variable diameter pulleys each having a first belt engaging flange adapted for mounting on one of the drive shaft of the prime mover and the input shaft of the apparatus to be driven and a second belt engaging flange that is axially movable relative to the first flange to vary the effective belt diameter of the pulley; a V-belt drivingly engaged about said pulleys between said flanges; a cylinder mounted in association with one of the flanges of the driver pulley; a fluid actuated piston within said cylinder and mounted in association with the other flange of the driver pulley, said cylinder and piston adapted to move the movable flange of the driver pulley toward the first flange thereof under increasing hydraulic fluid pressure; actuating means for said driven pulley adapted to move the movable flange thereof to adjust the effective belt diameter of said driven pulley inversely of a change in the effective belt diameter of said driver pulley; a fluid pump for supplying fluid under pressure to said cylinder and piston; an adjustable valve in the connection of said pump to said cylinder and piston and including a valve plunger that is axially movable to vary the pressure in said cylinder and piston and thereby to vary the effective belt diameter of said driver pulley; a support; flange follower means slidably supported in said support and movable axially in response to movement of the movable flange of said driver pulley; a control rod slidably supported for axial movement in said support; a lever pivotally supported at one end on said flange follower means and having its opposite end in engagement with said valve plunger, said control rod being pivotally connected to said lever intermediate the ends of said lever and adapted to pivot said lever to adjust the axial position of said valve plunger; and control means operable upon the control rod and adapted to vary the axial position of the control rod and thereby to vary the speed of the driven pulley relative to the speed of the driver pulley, said flange follower means being moved as the movable flange of said driver pulley is moved due to changes in load of the apparatus to be driven to thereby pivot said lever about the control rod to change the axial position of said valve plunger, whereby a given speed for said driven pulley is maintained regardless of the load of the driven apparatus.

9. In a variable speed drive, the combination comprising: a reversible electric motor having a drive shaft; two speed motor reduction means having an input shaft and an output shaft interconnected by a pair of power trains that are alternately selectable by selection of the direction of rotation of said input shaft, one of said power trains being adapted to accomplish a greater reduction in speed of the output shaft relative to the input shaft than the other power train to provide selectable low and high speed ranges; a V-belt drive drivingly connecting the motor drive shaft and the input shaft of said motor reduction means and comprising driver and driven variable diameter pulleys each having an axially stationary flange and a second flange that is axially movable relative to the stationary flange to vary the effective belt diameter of the pulley, one of said pulleys having its stationary flange mounted on said motor drive shaft and the other of said pulleys having its stationary flange mounted on said input shaft, and a V-belt drivingly engaged about said pulleys and between said flanges, said driven pulleys being adjustable relative to said driver pulley to accommodate changes in the effective belt diameter of the driver pulley; actuator means for said driver pulley adapted to move the second of said flanges thereof relative to the stationary flange to vary the speed of said input shaft relative to said motor drive shaft; a reversing motor control circuit for said motor; and unitary control means for said actuator means and for said motor control circuit, said control means being adapted to control said actuator means to vary the speed of the output shaft of said motor reduction means between low and high speeds within each speed range and adapted to automatically selectively reverse the direction of rotation of said motor after the low speed range has been traversed in a speed increasing cycle and after the high speed range has been traversed in a speed decreasing cycle.

References Cited in the file of this patent
UNITED STATES PATENTS

| | | |
|---|---|---|
| 1,035,860 | Conradson | Aug. 20, 1912 |
| 2,293,617 | Myers | Aug. 18, 1942 |
| 2,660,069 | Horne et al. | Nov. 24, 1953 |
| 2,687,658 | Nelson et al. | Aug. 31, 1954 |
| 2,779,203 | Eubanks | Jan. 29, 1957 |
| 3,082,636 | Steinlein | Mar. 26, 1963 |

UNITED STATES PATENT OFFICE
CERTIFICATE OF CORRECTION

Patent No. 3,146,633                      September 1, 1964

Walter P. Schmitter, deceased, by A. Louise Schmitter
and Robert V. Abendroth, co-executors, et al.

It is hereby certified that error appears in the above numbered patent requiring correction and that the said Letters Patent should read as corrected below.

Column 6, line 67, for "drive" read -- driver --; column 11, line 75, the indistinct numeral should be -- 117 --; column 12, line 26, after "control" insert -- knob --; line 67, for "rise" read -- ride --; column 13, line 26, for "wire" read -- wide --; line 49, for "on" read -- of --.

Signed and sealed this 29th day of December 1964.

(SEAL)
Attest:

ERNEST W. SWIDER                      EDWARD J. BRENNER
Attesting Officer                       Commissioner of Patents